(12) United States Patent
Janes (10) Patent No.: US 9,010,504 B2
(45) Date of Patent: *Apr. 21, 2015

(54) SHOCK ABSORBER WITH PRESSURE-CONTROLLED DAMPING

(75) Inventor: Dustin F. Janes, Santa Cruz, CA (US)

(73) Assignee: Fox Factory, Inc., Scotts Valley, CA (US)

( * ) Notice: Subject to any disclaimer, the term of this patent is extended or adjusted under 35 U.S.C. 154(b) by 99 days.

This patent is subject to a terminal disclaimer.

(21) Appl. No.: 13/528,067

(22) Filed: Jun. 20, 2012

(65) Prior Publication Data

US 2012/0305353 A1 Dec. 6, 2012

Related U.S. Application Data

(63) Continuation of application No. 10/595,423, filed on Mar. 5, 2009, now Pat. No. 8,205,730, which is a continuation of application No. 10/888,080, filed on Jul. 8, 2004, now abandoned.

(60) Provisional application No. 60/501,903, filed on Sep. 10, 2003, provisional application No. 60/485,409, filed on Jul. 8, 2003.

(51) Int. Cl.

| | |
|---|---|
| *F16F 9/00* | (2006.01) |
| *B60G 15/12* | (2006.01) |
| *B60G 17/056* | (2006.01) |
| *B60G 17/08* | (2006.01) |
| *F16F 9/06* | (2006.01) |
| *F16F 9/44* | (2006.01) |
| *F16F 9/516* | (2006.01) |
| *F16D 57/00* | (2006.01) |
| *F16F 9/20* | (2006.01) |
| *F16F 9/34* | (2006.01) |
| *F16F 9/32* | (2006.01) |

(52) U.S. Cl.
CPC . *B60G 15/12* (2013.01); *F16F 9/20* (2013.01); *F16F 9/3405* (2013.01); *F16F 9/34* (2013.01); *F16F 9/3214* (2013.01); *B60G 17/056* (2013.01); *B60G 17/08* (2013.01); *B60G 2202/154* (2013.01); *B60G 2500/20* (2013.01); *B60G 2500/206* (2013.01); *F16F 9/064* (2013.01); *F16F 9/44* (2013.01); *F16F 9/516* (2013.01)

(58) Field of Classification Search
CPC ............... F16F 7/00; F16F 7/125; F16F 9/00; F16F 9/06; F16F 9/062; F16F 9/3207; F16F 9/3214; F16F 9/34; F16F 9/3405; F16F 9/50; F16F 9/512; F16F 9/516; B60G 17/056; B60G 17/08
USPC ......... 188/266, 281, 283, 289, 313, 316, 317, 188/322.13, 322.15; 267/64.11, 64.15, 267/64.18, 64.22; 137/625.12, 625.13

See application file for complete search history.

(56) References Cited

U.S. PATENT DOCUMENTS

| | | |
|---|---|---|
| 4,153,237 A | 5/1979 | Supalla |
| 4,683,992 A | 8/1987 | Watanabe |

(Continued)

*Primary Examiner* — Melody Burch
(74) *Attorney, Agent, or Firm* — Patterson & Sheridan, LLP; David M. Haugen (57) ABSTRACT

A damper includes a pressure-sensitive damping control circuit that selectively permits fluid flow from a first chamber to a second chamber. A piston varies a volume of the first chamber. A blow-off piston is movable between a closed position, wherein fluid flow through the control circuit is substantially prevented, and an open position, wherein fluid flow through the control circuit is permitted. The damper also includes a first source of pressure. A fluid pressure created by compression of the damper applies an opening force to the blow-off piston moving the blow-off piston in a direction toward the open position against a resistance force provided by the first source of pressure. The resistance force exceeds the opening force until the pressure created by forces tending to insert the piston rod into the first fluid chamber exceeds the pressure in the first source of pressure by a predetermined amount.

21 Claims, 9 Drawing Sheets

(56) References Cited

U.S. PATENT DOCUMENTS

| | | |
|---|---|---|
| 5,190,126 A | 3/1993 | Curnutt |
| 5,251,730 A * | 10/1993 | Ackermann et al. ........... 188/315 |
| 5,954,167 A | 9/1999 | Richardson et al. |
| 6,254,067 B1 | 7/2001 | Yih |
| 6,267,400 B1 * | 7/2001 | McAndrews .................. 280/285 |
| 6,286,641 B1 | 9/2001 | De Frenne |
| 6,305,512 B1 | 10/2001 | Heinz et al. |
| 6,622,831 B2 * | 9/2003 | Roper ........................... 188/315 |
| 8,205,730 B2 * | 6/2012 | Janes ............................ 188/314 |
| 2003/0089565 A1 * | 5/2003 | Salice ........................... 188/283 |

* cited by examiner

Prior Art

SHOCK ABSORBER WITH PRESSURE-CONTROLLED DAMPING

RELATED APPLICATIONS

This application is a continuation of U.S. patent application Ser. No. 10/595,423, filed Mar. 5, 2009, now U.S. Pat. No. 8,205,730, which is a continuation of U.S. patent application Ser. No. 10/888,080, filed Jul. 8, 2004, now abandoned, which claims priority to U.S. Provisional Patent Application Nos. 60/501,903, filed Sep. 10, 2003 and 60/485,409, filed Jul. 8, 2003.

INCORPORATION BY REFERENCE

U.S. Non-Provisional patent application Ser. No. 10,595,423, filed Mar. 5, 2009, now U.S. Pat. No. 8,205,730; Ser. No. 10/888,080, filed Jul. 8, 2004, now abandoned; and U.S. Provisional Patent Application Nos. 60/501,903, filed Sep. 10, 2003; and 60/485,409, filed Jul. 8, 2003, are hereby incorporated by reference herein in their entireties and made a part of the present specification.

BACKGROUND OF THE INVENTION

1. Field of the Invention

This invention relates to fluid damping control for vehicle suspensions, such as the suspensions of bicycles, which are typically mounted between the bicycle frame (chassis) of the vehicle and a wheel of the vehicle.

2. Description of the Related Art

Shock absorbers used on motorized and human powered vehicles provide a means to damp out road vibration, bump energy and substantially increase rider/passenger comfort. The shock absorber component is composed of two parts. First being the damper, the component that absorbs the bump energy and second the supporting spring. It is common in high performance shock absorbers to have an external reservoir to which the shock fluid can circulate. The fluid that circulates to the reservoir is a result of the shock shaft insertion at the shock absorber. The insertion of the shock shaft onto the shock body will occupy a volume that displaces the oil towards the reservoir. This reservoir can be mounted to the main shock absorber or connected by means of a length of high-pressure hose.

Under certain circumstances, it is advantageous to restrict the flow of oil (incompressible fluid) into the reservoir. The function of flow restriction aids in creating compressive direction damping, referred to as compression damping. Compression damping will be created at the reservoir when fluid is displaced from the shock absorber. The combination of flow restriction at the main piston within the shock absorber, for example as a result of flexible washers sealing holes on the main piston, coupled with compression damping at the reservoir, provides the total compression damping created by the shock absorber system. The devices used to create compression damping in the reservoir are of many types. A plate covered by flexible washers is one example of a device. Other methods employ passages blocked by movable balls or plates forced into position by a spring. A further type of device uses a simple passage that is restricted by a movable protrusion that changes the clearance between the passage and protrusion.

Another feature known in the art for providing compression damping in an internally-pressurized shock absorber is an annular cavity containing compressible fluid formed between the main shock absorber piston and the piston rod. A second annular piston in sealed engagement with the cavity is driven by pressure forces and reciprocates in the cavity to alternately block the compression damping passageways in the main piston as the piston approaches the blind end of the shock absorber cylinder, and unblock them as the piston withdraws from the blind end. The annular cavity and the annular piston which reciprocates within it are configured coaxially on the main piston and shaft of the shock absorber. See also U.S. Pat. No. 5,190,126.

There is a need in bicycles, motorcycles, and other vehicles which incorporate fluid suspension shock absorbers for a pressure-controlled damping circuit in a separate, non-coaxial reservoir. All prior-art methods, such as those noted above, suffer from various limitations, including an impact on the travel capability within a given shock absorber length, fixed location and installation requirements, and limited adjustment range.

SUMMARY OF THE INVENTION

A preferred embodiment involves a pressure sensitive damper including a first cylinder at least partially defining a first fluid chamber containing a damping fluid. A damping piston is supported for reciprocal motion within the first cylinder. A piston rod has a first end, which is connected to the damping piston, and a second end, which extends through a sealed opening in a seal head fixed to a first end of the first cylinder. The damper also includes a second cylinder at least partially defining a second fluid chamber in selective fluid communication with the first cylinder and containing a damping fluid. A compression damping plate is fixed in the second cylinder and includes at least one passage through which the damping fluid, displaced by the entrance into the first cylinder of successive portions of the piston rod during a compression stroke, flows in a first direction from the first fluid chamber to the second fluid chamber. A first pressure source is in communication with the second fluid chamber. The damper further includes a valve which generates a resistance force to the fluid flow through the at least one passage in the first direction, wherein the resistance force varies according to an amount of force communicated to the valve by the first pressure source. The valve includes a blow-off piston, a support shaft, a support plate, and an intensifier piston. The blow-off piston has a first position in engagement with the at least one passage and a second position removed from the at least one passage. The first pressure source acts on a first end of the intensifier piston. The blow-off piston, the support shaft, and a second end of the intensifier piston define a third fluid chamber containing damping fluid therebetween.

DETAILED DESCRIPTION OF THE PREFERRED EMBODIMENT

Figure 1:
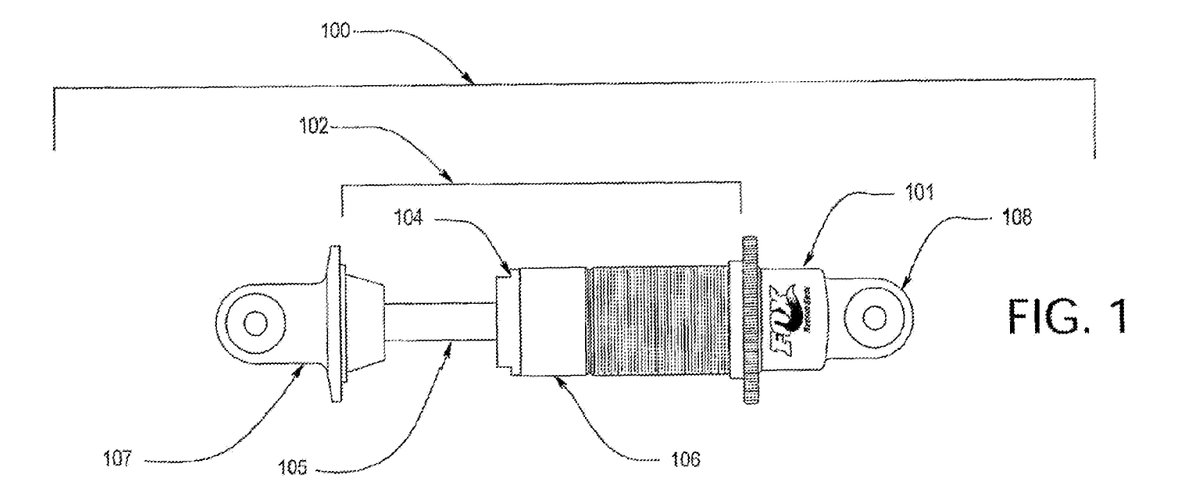
FIG. 1 is a plan view of a prior-art embodiment of a suspension unit including a monotube shock absorber ("damper") integrated with an in-line internal floating piston ("ifp").
Figure 2:
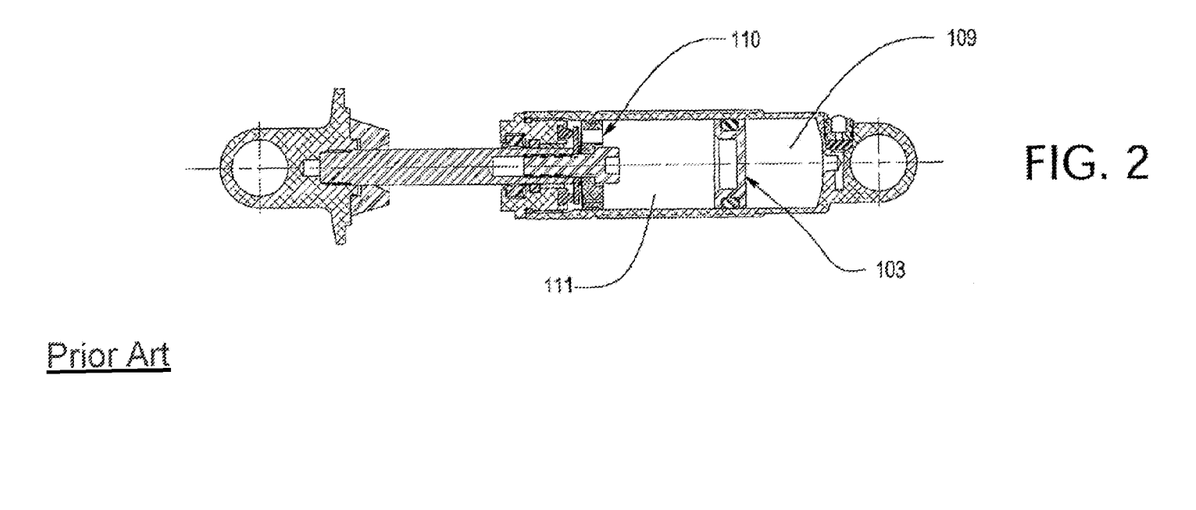
FIG. 2 is a cross-sectional view of the prior-art suspension unit of FIG. 1.

The prior-art integrated suspension unit 100 of FIGS. 1 and 2 are described first, in order to provide a point of reference for a better understanding of the improvements of a preferred embodiment of the present invention, which is described further on.

One example of a typical prior-art shock absorber 100 as shown in FIGS. 1 and 2 is manufactured by Fox Racing Shox. It will be understood by one of ordinary skill in the art, that this specific prior-art embodiment is representative only, and that preferred embodiments of the present invention can be applied to other types of shock absorbers, or dampers, as well.

FIGS. 1 and 2 illustrate one example of a prior art shock absorber, or integrated suspension unit, generally referred to by the reference numeral 100. The illustrated integrated suspension unit 100 generally includes a damper assembly 101 and a biasing member, such as spring 102 (shown schematically in FIG. 1). In other arrangements, the biasing member may comprise an air spring assembly, as will be appreciated by one of ordinary skill in the art.

The major components of the illustrated suspension unit 100 include the seal head 104, shock shaft 105, shock body 106 defining a fluid chamber 111, shaft eye 107, body eye 108, gas chamber 109, and main damping piston 110.

The ends of the integrated suspension unit 100, the body eye 108, and the shaft eye 107, are connected to the sprung (e.g., the vehicle body) and un-sprung (e.g., the wheels and wheel support assemblies) portions of the vehicle (not shown) in a conventional manner. That is, either of the ends 107, 108 may be connected to either of the sprung or unsprung portions of the vehicle, depending on the specific application. The coil spring 102 creates a force tending to lengthen the suspension unit 100, while the weight of the vehicle (i.e., the sprung mass) tends to shorten it. As is well known in the art, the net effect of the compression of the coil spring 102 under the mass of the vehicle, is known as "sag". When the integrated suspension unit compresses or sags-in, the shock shaft 105 enters the shock body and decreases the length of the shock (i.e., the distance between the ends 107, 108). When the shock shaft 105 enters the shock, a volume of the shock oil contained in fluid chamber 111 of the damper assembly is displaced, thus causing the internal floating piston 103 to move a corresponding distance.

Figures 3, 4:
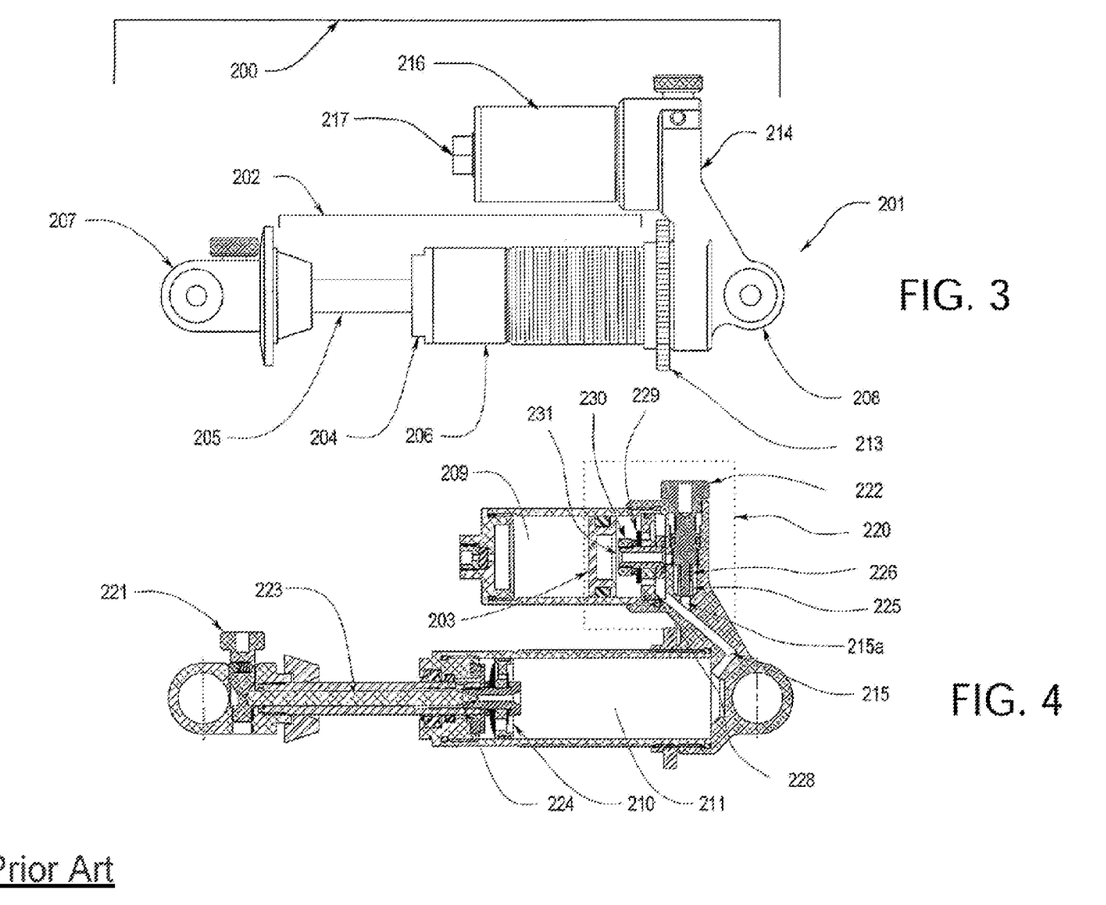
FIG. 3 is a plan view of a prior-art embodiment of a suspension unit including a shock absorber ("damper") having a solid structure connection to a fluid reservoir.
FIG. 4 is a cross-sectional view of the prior-art suspension unit of FIG. 3.

In FIGS. 3 and 4 the integrated suspension unit 200 is comprised of a damper assembly 201 and a biasing member, or coil spring assembly 202 (illustrated schematically in FIG. 3), that form the integrated suspension unit 200. This type of shock is similar to integrated damper assembly 100 with the exception that the internal floating piston 203 is not positioned coaxially with the shock shaft 205. The piggyback housing 214 contains a passage for displaced shock oil 215 to flow through. The piggyback housing 214 rigidly secures the reservoir housing 216 to the shock body 206. This type of damper assembly is capable of a reduction in overall length vs. travel in comparison to the integrated damper assembly 100, as a result of the non-coaxially placed high pressure gas charge 209 and internal floating piston 203.

The major components found in integrated suspension unit 200 are similar to components found in the integrated suspension unit 100. For example the following components of the illustrated integrated suspension unit 200 are typical in a remote reservoir-type suspension unit: seal head 204, shock shaft 205, shock body 206 defining a fluid chamber 211, shaft eye 207, body eye ring 208, pressurized gas chamber 209, main damping piston 210, spring threaded collar 213, reservoir housing 216, piggyback housing 214, and reservoir end cap 217.

Figure 5A:
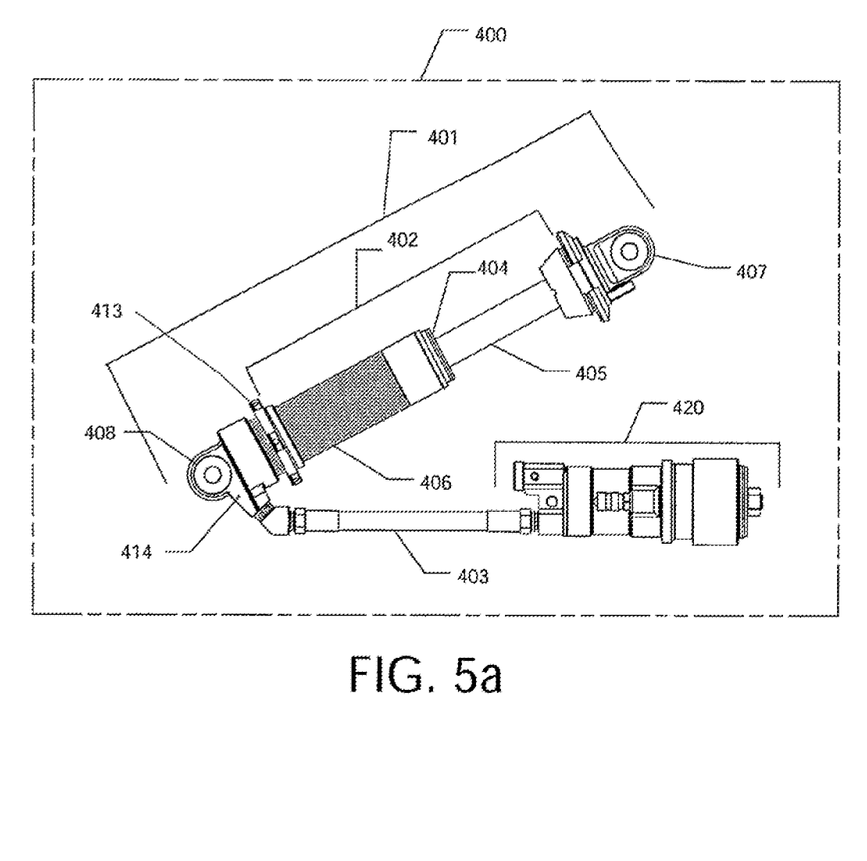
FIGS. 5a-5c show three overall views of a preferred embodiment of a suspension unit according to a preferred embodiment of the present invention.
Figure 5B:
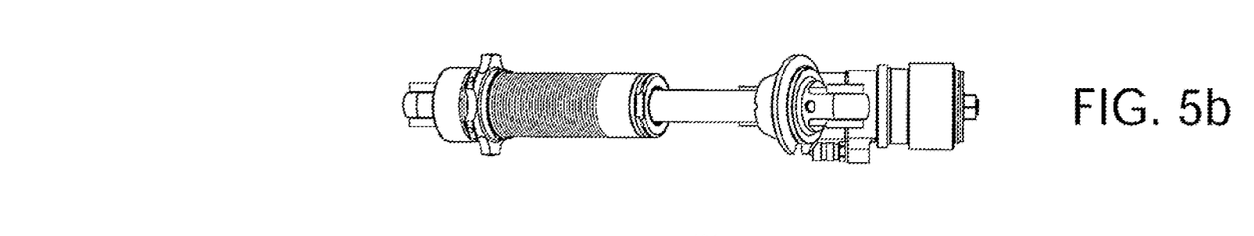
Figure 5C:
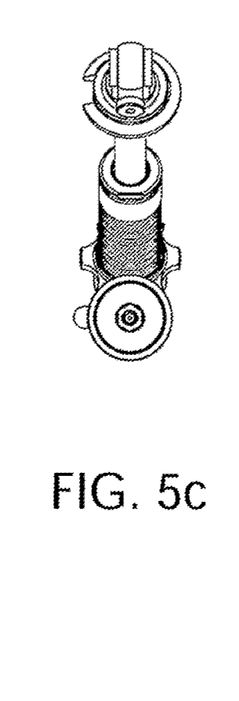
Figure 6:
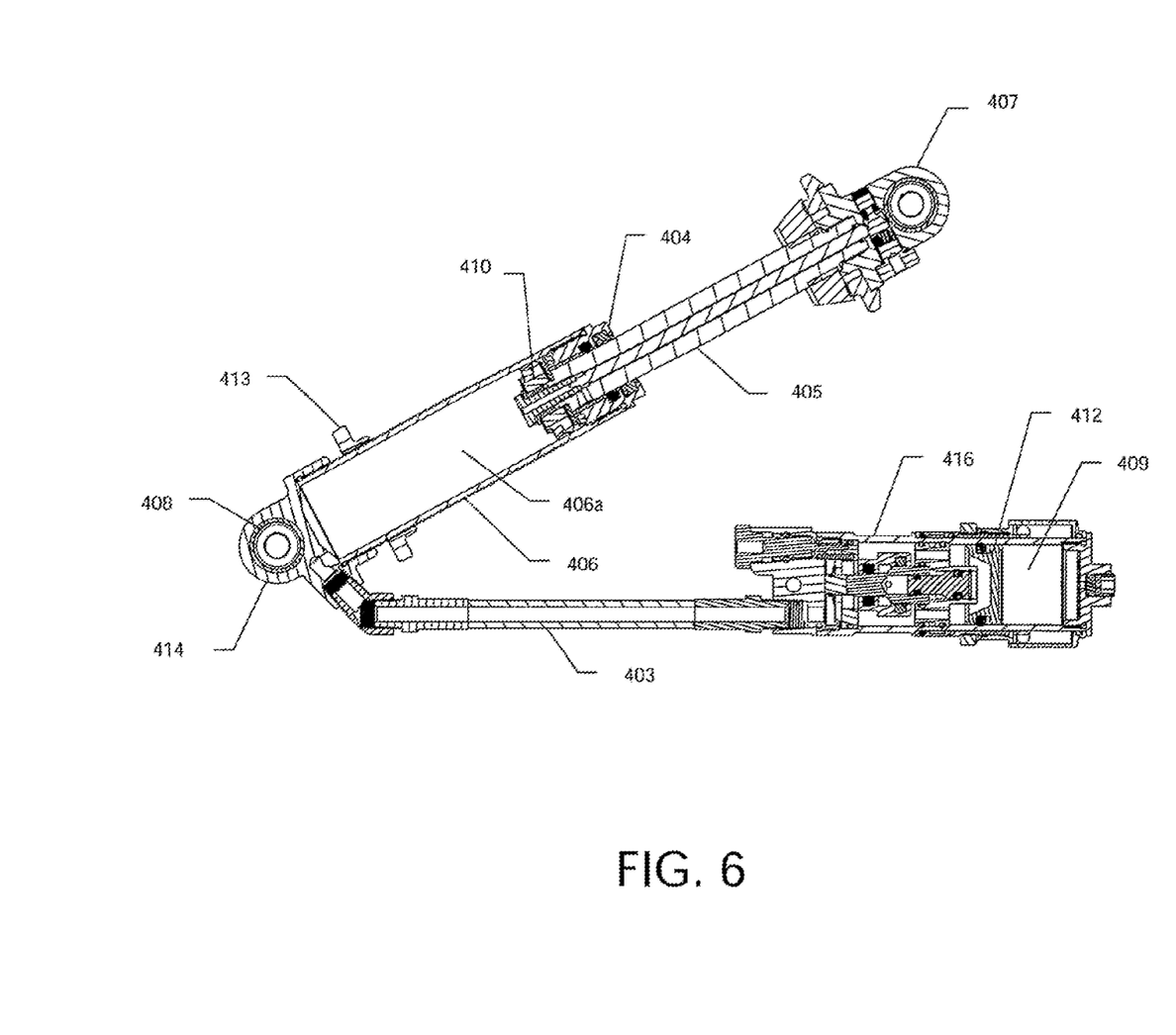
FIG. 6 is a cross-sectional view of the suspension unit of FIGS. 5a-5c.
Figure 7A:
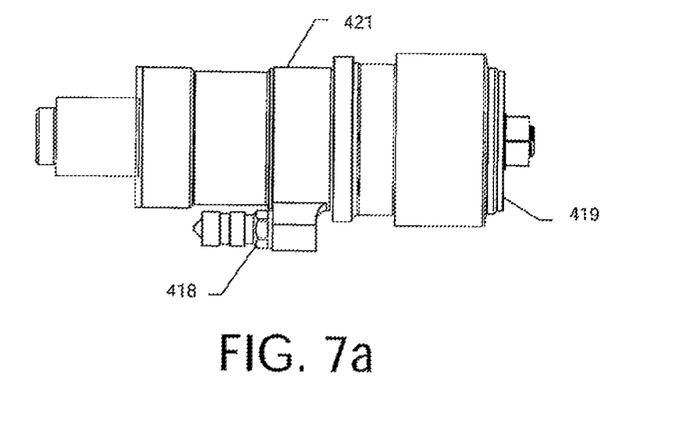
FIGS. 7a-7d include several views of a reservoir assembly of the suspension unit of FIGS. 5a-5c.
Figure 7B:
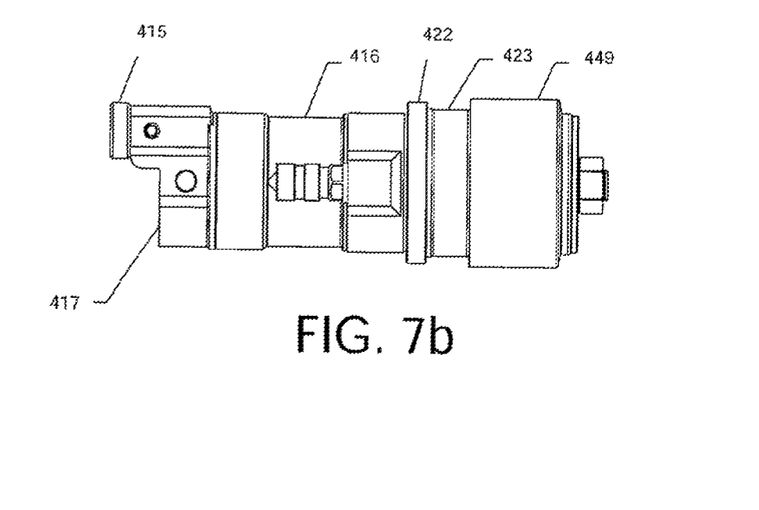
Figure 7C:
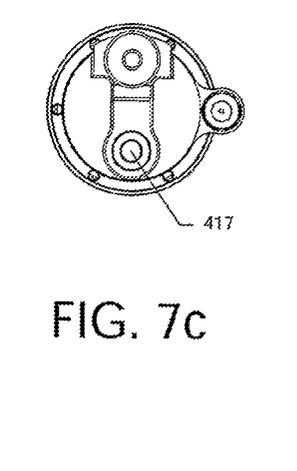
Figure 7D:
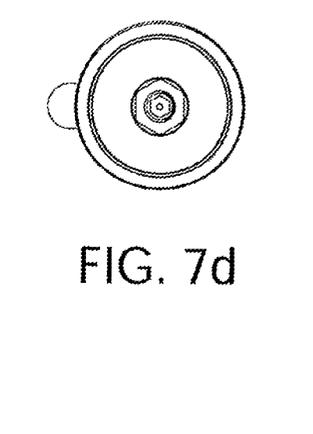

With reference to a preferred embodiment of the integrated suspension unit 400 illustrated in FIGS. 5 and 6, when the shock compresses, shock oil is displaced to the reservoir assembly 420 through the flexible hose 403. The amount of shock oil that is displaced into the reservoir housing 416 during a given distance of compression travel is generally equal to the volume of the shock shaft 405 that has entered the main shock body 406 during the given compression travel. In the process of the shock oil being displaced into the reservoir housing 416, preferably it encounters a structure, or system, that resists the movement, or flow, of the shock oil. Such a structure, or system, provides a compression damping force, tending to resist compression movement of the suspension unit 400, and may be of any suitable construction, such as a restrictive orifice, shim stacks, check plate(s), for example but without limitation, as will be readily appreciated by one of ordinary skill in the art. The structure, or system, is referred to as the reservoir assembly 420.

Referring back to the prior-art integrated suspension unit 100 of FIGS. 1 and 2, the suspension unit 100 did not contain externally-adjustable damping features. In contrast, the suspension unit 200 of FIGS. 3 and 4 includes external adjustment features such as the rebound adjustment knob 221 and compression adjustment knob 222. The rebound adjustment knob 221 rotates and has a cone-shaped portion that mates with the adjuster rod 223 end. As the rebound adjuster knob 221 advances (moves in a downward direction in FIG. 4), the complementary interface between the adjuster rod 223 end and cone-shaped portion transfer rotational movement of the rebound adjuster knob 221 into linear translation of the adjuster rod 223 (moves to the right in FIG. 4). As the adjuster rod advances towards the main damping piston assembly 210, it occupies a progressively larger portion of a passage 224 for shock oil to bypass the main functional features of the damping piston assembly 210. If desirable, the adjuster rod 223 may completely close off the passage 224 to prevent a flow of fluid therethrough. This construction permits external adjustment of rebound damping, as will be understood by those skilled in the art.

Although such a rebound damping adjustment feature is not required for application of the preferred embodiment, it is illustrated here and is also included in the illustrated embodiment of the present shock absorber, as shown in FIGS. 5-10. If this adjustable damping feature is not included, a somewhat simplified and less costly preferred embodiment of the present invention is made possible.

Figure 11:
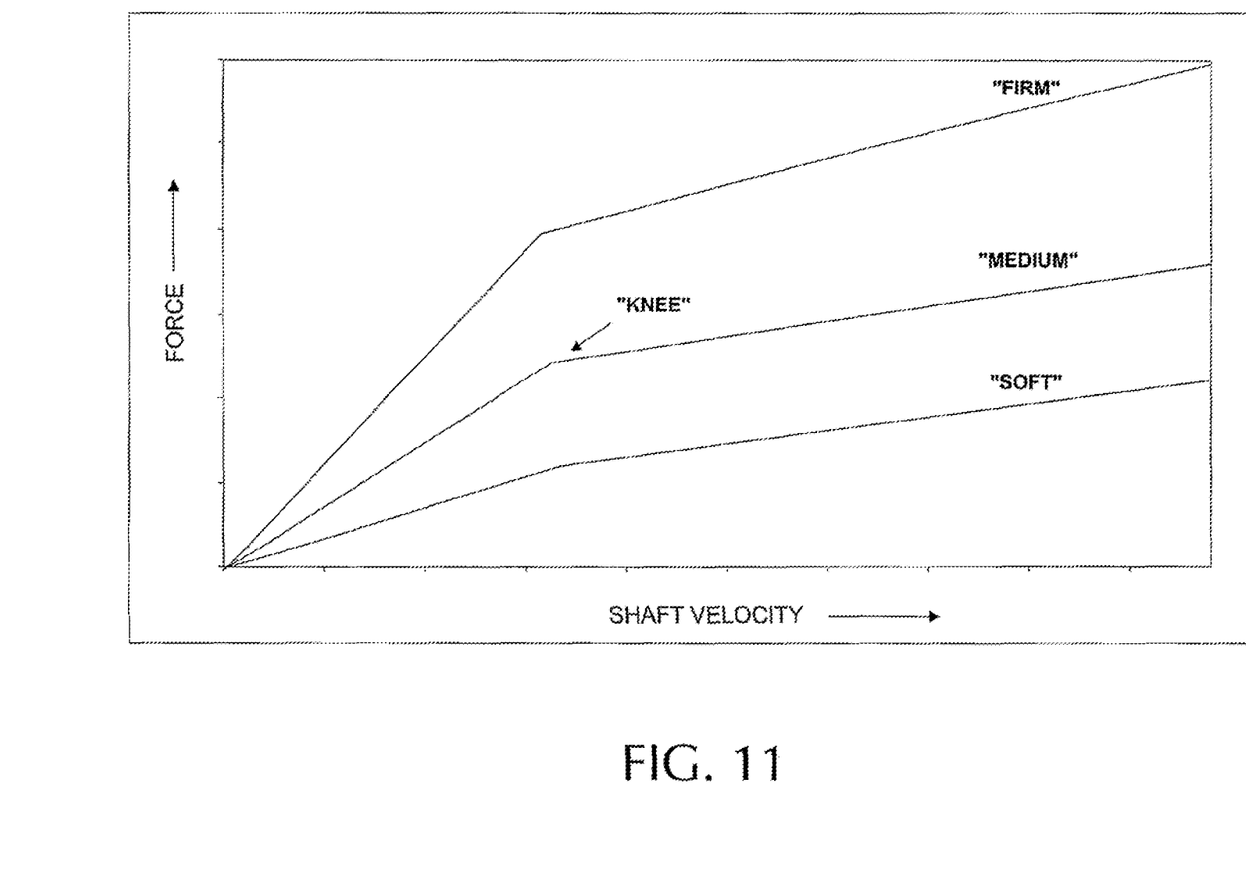
FIG. 11 is a force vs. velocity compression damping graph depicting "Firm" and "Soft" as well as "Knee" damping function.

FIG. 4 illustrates the reservoir compression damping circuit 220 that functions as a "gate" to the shock oil that is displaced from the main shock body 206 by the volume occupied by the insertion of the shock shaft 205. When the shock oil encounters the reservoir compression damping circuit 220, it has two directions that it can flow based on the position of the compression adjustment knob 222. If the compression adjustment knob 222 is in a fully counter-clockwise position, the sealing force provided by the compression port seal plate 225 is relatively light, based on the force that the compression plate spring 226 applies to the compression port plate 225 to seal the plate 225 against a port 215a in the piggyback housing 214. Due to the light sealing force of the compression port seal plate 225, the shock oil will flow through this bypass circuit with relative ease and thereby bypass the reservoir compression piston 228. The functional damping characteristics that this adjustment position provides are illustrated in FIG. 11 and can be described as "Soft".

When the compression adjustment knob 222 is in the fully clockwise position, the spring load provided by the compression plate spring 226 on the compression port plate 225 is at a maximum. The damping characteristic of this compression knob 222 position is illustrated in FIG. 11 and can be described as "Finn". As a result of the increased sealing force provide by the compression port plate 225, the shock oil entering the reservoir 216 will take a path of least resistance. In the illustrated embodiment, the path that the shock oil finds least resistive, in the fully clockwise position of the adjustment knob, is through the reservoir compression piston 228 that provides resistance to shock oil flow as a result of flexible metal washers 229 sealing the out-flow face of the reservoir compression piston 228. The flexible metal washers 229 are retained on the reservoir compression piston 228 by a piston nut 230 and piston bolt 231.

If a position of the compression adjustment knob 222 is between fully clockwise and fully counter-clockwise, the net compression damping function of both of the shock oil paths described above (through the bypass port 215 or through the reservoir compression piston 228) will influence a flow of shock oil into the reservoir housing 216. Furthermore, under certain circumstances, fluid flow may occur through both paths even when the compression adjustment knob 222 is in a fully clockwise or fully anti-clockwise position, as will be apparent to one of skill in the art. This construction permits external adjustment of compression damping, as will be readily appreciated by one of skill in the art.

The main damping piston 110/210 of the suspension units 100/200, as illustrated in FIGS. 2 and 4, function such that, as the main damping piston assembly 110/210 moves through the shock oil 111/211, a damping force is produced. Further descriptions of the main damping piston assembly 110/210 function are not deemed necessary, as one skilled in the art will understand possible structures and functions of the main damping piston assembly 110/210, as well as the main damping piston 410 of the suspension unit 400 of FIGS. 5-10.

A preferred embodiment of the present shock absorber with pressure controlled damping, generally referred to by the reference numeral 400, is described in greater detail with reference to FIGS. 5-10. Components or features of the shock absorber 400 not described in detail hereinafter may be assumed to be similar in construction and function to the same, or similar, components or features of the suspension units 100/200 described above. Thus, the description of a preferred embodiment illustrated in FIGS. 5-10 is focused on the illustrated embodiment of a pressure controlled damping arrangement.

It is an object of the illustrated embodiment to provide a compression damping circuit with a pressure-controlled damping feature that is integrated with a shock absorber to provide damping control. This type of circuit provides a method to adjustment of the overall damping created by the shock absorber externally and quickly. Conventional prior-art designs are limited in adjustment and function. This circuit is particularly applicable to bicycles; however, it may also be readily adapted for use with other vehicles as well.

In the context of real-world mountain biking, many prior-art methods of adjusting damping function create a restriction on shock placement or size, that require reduction in permitted travel and limited damping adjustment. In contrast, placement of pressure controlled damping circuits in a remote location opens up available "dead length" within the mounting locations of the main shock body. It is also advantageous to adjust damping function as terrain and trail conditions continually change, thus permitting the rider to adjust for the desired ride feel or current situation.

The embodiment illustrated in FIGS. 5-10 achieves this result by placing the pressure controlled damping circuit in a remote location other than within the axis of the main shock body, thus freeing up space. In certain preferred embodiments, the pressure controlled damping function is externally adjustable by pressure adjustment, pressure balance adjustment, as well as incompressible fluid bypass adjustment, for example.

In one preferred embodiment, the components within the remote reservoir are arranged and function in the following manner. The oil entering the remote reservoir first encounters a compression damp plate cover, which is arranged to cover one or more passages in a wall, or compression damp plate. Other passages may exist in the compression damp plate, such as passages for rebound fluid flow from the reservoir to the main shock body (referred to herein as "rebound passages"). Preferably, such passages include a one-way valve mechanism that substantially prevents fluid flow from the main shock body to the reservoir, but permits fluid flow from the reservoir to the main shock body.

A valve body, or blow-off piston, is configured to selectively cover and substantially prevent fluid flow through the passage, thereby creating a sealed fluid cavity, or chamber, within the reservoir cylinder. This cavity is sealed by force/pressure provided by an incompressible fluid contained in a separate, intermediate sealed chamber, between the blow-off piston and an intensifier piston. The pressurized fluid within the sealed chamber is driven by the intensifier piston, which has a seal at both big and small diameters. The intensifier components are powered by the internal pressure of the shock that is created by the separate compressible gas volume, or gas charge, that is isolated from the sealed fluid cavity by an internal floating piston gas separator. The internal pressure of the shock is used to create the sealing force of the blow-off piston. The internal pressure may alternatively be provided by other suitable arrangements, such as a spring-biased floating piston or gas-charged collapsible sleeve, for example.

In order to provide further tune-ability of the blow-off system, a separate variable volume chamber that contains a compressible gas may be located between the differing diameters on the intensifier piston. This passage or volume has gas introduced by way of an air sleeve surrounding the reservoir. The pressure of the gas within the variable volume chamber counteracts the pressure that is applied to the end face of the intensifier piston by the internal pressure of the shock itself, which, in the illustrated embodiment, is the pressure within the reservoir chamber produced by the gas charge. With this, the sealing force on the blow-off piston can be reduced to zero, provided that a high enough compressible gas pressure is present in the compressible gas volume.

Other components of the pressure controlled damping circuit may include a by-pass circuit, including a by-pass needle controlled by a by-pass knob. The external incompressible fluid by-pass needle, when in the fully seated position will not permit fluid to bypass the compression damping plate through the bypass port. As the external fluid bypass needle is backed away from the surface of the compression damping plate, incompressible oil is permitted to flow through the by-pass port. Adjustment of the by-pass knob to permit fluid flow through the bypass port increases the incoming fluid pressure necessary to move the blow-off piston.

Further advantages of the illustrated embodiment include an internal pressure increase based on the position of the shock shaft insertion into the shock body. The pressure increase in the compressible gas volume as the shock shaft inserts into the main shock body, in turn, imparts the same amount of pressure increase to the incompressible oil present on the other side of the internal floating piston gas separator within the reservoir chamber. This same pressure is imparted on the largest end face of the intensifier piston, which increases the sealing force on the blow-off piston, through the intermediate incompressible fluid chamber. This arrangement provides an increase in sealing force of the blow-off piston with the compression damping plate. With this, the compression damping system of the illustrated shock absorber includes position sensitive traits that would not otherwise be available in a DeCarbon-type shock absorber, which are strictly velocity sensitive. In addition, the preferred embodiment has a wide range of tune-ability, not found in existing shock systems.

FIGS. 5a-5c are external views of a preferred embodiment of the present shock absorber. A suspension unit, or shock absorber 400, includes a damper assembly 401, which is similar in external appearance to damper assembly 201, with the exception that the connection between the main shock body 406 to the reservoir assembly 420 is made with a flexible hose 403 rather than rigidly mounted with the piggyback housing 214, as is the case with the damper assembly 201 of FIGS. 3 and 4. One skilled in the art will appreciate that the attachment between the "damper assembly" and "reservoir housing" can be made with a rigid mount or hose and function in a substantially equivalent manner. Further, the flexible hose 403 offers additional mounting positions of the reservoir assembly 420, as compared to the rigid and fixed position offered by the piggyback housing 214. The illustrated embodiment is shown with a flexible hose, but could also use a rigid mount similar to the piggyback housing 214.

As with the shock absorbers 100/200 of FIGS. 1 and 3, the embodiment shown in FIG. 5 includes a biasing member, or coil spring 402 (shown schematically in FIG. 5 a), which operates to apply a force tending to lengthen the shock absorber 400. In addition, a spring threaded collar 413 functions to increase or decrease a preload on the coil spring 402.

The primary components of the illustrated embodiment shown in FIGS. 5 and 6 are similar to the components found in the integrated suspension units 100 and 200 of FIGS. 2 and 4, respectively. For example, a preferred embodiment of the present shock absorber includes a flexible hose 403, a seal head 404, a shock shaft 405, a main shock body 406, a shaft eye 407, a body eye ring 408, a high pressure gas charge 409, a main damping piston 410, a fluid chamber 406a containing damping fluid, an internal floating piston 412, a spring threaded collar 413, a shock body end cap 414, and a reservoir assembly 420.

Figure 8A:
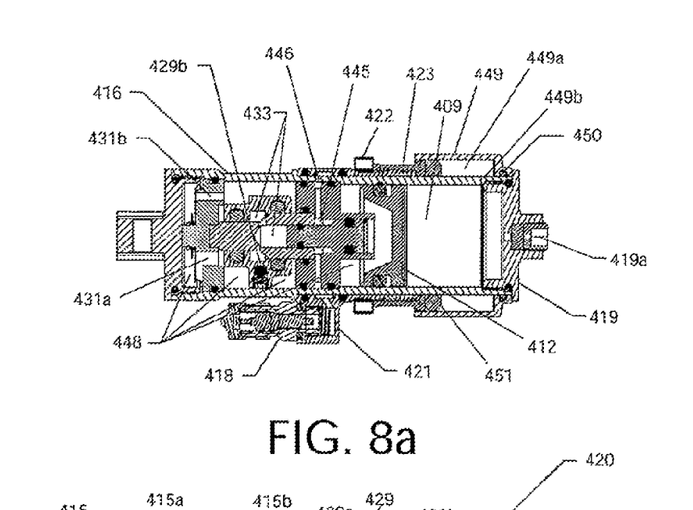
FIGS. 8a-8c include two cross-sectional views and an end view of the reservoir assembly of FIG. 7.
Figure 8B:
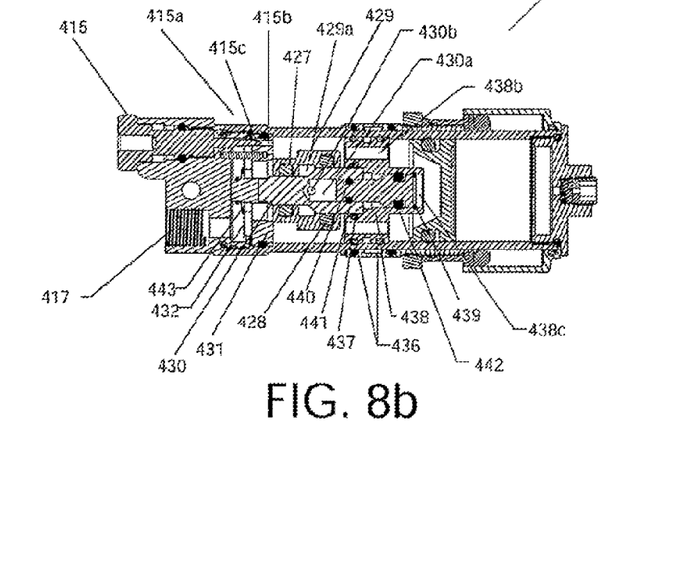
Figure 8C:
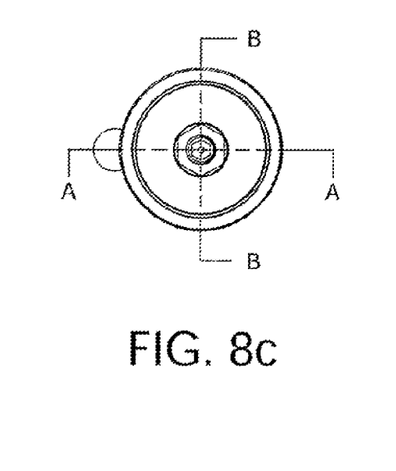

In operation, when the shock compresses, damping fluid is displaced from the compression chamber 406a of the main shock body 406 to the reservoir assembly 420 through the flexible hose 403. The amount of damping fluid displaced into the reservoir assembly 420 during a given compression travel of the shock absorber 400 is equal to the volume of the shock shaft 405 that has entered the main shock body 406 during the compression travel (i.e., a shaft displacement arrangement). In the process of the damping fluid being displaced into the reservoir assembly 420, it encounters a flow restriction that resists the movement, or flow, of the damping fluid into the reservoir, thus producing a damping force tending to resist compression motion of the shock absorber 400, as will be described more fully further on. In addition, compression damping forces may also be produced by the main damping piston 410. With reference to FIGS. 8a and 8b, a preferred embodiment of the reservoir assembly 420 is described. As described above, preferably, the reservoir assembly 420 enables an increase in the available shock absorber travel for a given overall length of the shock absorber 400.

The reservoir housing 416 preferably is a hollow, cylindrical tube, which is closed at a first end by a first end cap 417 and closed at a second end by a second end cap 419. A floating piston 412 separates the interior of the reservoir housing 416 into a sealed compressible fluid chamber, or gas chamber 409, and a sealed incompressible fluid chamber, or damping fluid chamber 448. An inlet port 417 permits damping fluid to enter the reservoir housing 416 from the damper assembly 401. An inlet port 419a permits compressible gas, such as nitrogen for example, to be introduced into the gas chamber 409.

The compression damp plate 431 forms an internal wall within the damping chamber 448 and includes at least one compression flow passage 431a passing axially therethrough. In addition, preferably, the compression damp plate 431 includes one or more rebound flow passages 431b passing axially therethrough. A one-way valve arrangement permits rebound fluid flow to flow through the rebound flow passages, but substantially prevents compression fluid flow from passing through the rebound flow passages. In the illustrated arrangement, the one-way valve mechanism includes a check plate, or cover plate 432, which is biased into contact with the compression damp plate 431 by a biasing member, such as spring 443, to cover the rebound flow passages. Rebound fluid flow through the rebound flow passages is permitted against the biasing force of the spring 443, which preferably is relatively light. Shock absorber rebound damping forces are generated at the main piston 410, as will be appreciated by one of skill in the art. Passage(s) 431a are provided in the compression damp plate 431 to permit compression fluid flow, and are selectively closed by a valve body, or blow-off piston 429, as is described in greater detail below.

The blow-off piston 429 closes the compression flow passage(s) 431a during rebound motion of the shock absorber 400. Thus, rebound fluid flow from the reservoir cylinder 416 to the main shock body 406 preferably occurs through the rebound flow passages as described above.

In the illustrated embodiment, the reservoir assembly 420 also includes a bypass circuit 415a. The illustrated bypass circuit 415a includes a tapered needle 415c and an orifice 415b, wherein orifice 415b passes axially through the compression damp plate 431. A tapered end of a needle 415c is positioned coaxially with the orifice 415b and is axially adjustable to occupy a greater, or lesser, portion of the cross-sectional area of the orifice 415b. An axial position of the needle 415c is adjustable by an adjustment knob 415 in threaded engagement with the end cap 417 and which supports, or is integral with, the needle 415c. Thus, fluid is permitted to flow through the orifice 415*b* in both compression and rebound directions. In a compression direction, the fluid may bypass the compression passage(s) 431*a*, flow through which is controlled by the blow-off piston 429, as is described in greater detail below. Preferably, the needle 415*c* is adjustable to a position to completely close the orifice 415*b* and effectively eliminate the bypass circuit 415*a*. In other arrangements, the bypass circuit 415*c* may be omitted entirely, as will be appreciated by one of skill in the art.

Preferably, a support assembly extends in an axial direction from the end cap 417 into the damping chamber 448 to support additional components of the reservoir assembly 420, including the blow-off piston 429. The support assembly preferably includes a support shaft 430 and a support plate 438 extending from the end cap 417 in that order. The support plate 438 is secured to an end of the support shaft 430 opposite the end cap 417. A seal 437 creates a substantially fluid-tight seal between an external surface of the support shaft 430 and an internal surface of the support plate 438.

The support shaft 430 includes a small diameter end, nearest the end cap 417, and a large diameter end. The large diameter end defines a central cavity 430*a*, which opens at an end surface of the large diameter end opposite the end cap 417. An orifice 430*b* extends in a radial direction through the support shaft 430 from the cavity 430*a*. The support plate 438 includes a passage 438*c* extending axially therethrough. The passage 438*c* is aligned with the cavity 430 of the support shaft 430 and, preferably, the cavity 430 has a smaller diameter than the passage 438*c*. An outer peripheral surface of the support plate 438 supports seals 436, which create a fluid tight seal with the internal surface of the reservoir housing 416. In addition, the support plate 438 includes one or more axial ports 438*b*, which permit damping fluid flow substantially unrestricted therethrough.

An intensifier piston 440 is supported for axial movement within the cavity 430*a* and passage 438*c* of the support plate 438. The small diameter end of the intensifier piston 440 is supported by the cavity 430*a* and the large diameter end of the intensifier piston 440 is supported by the passage 438*c*. Seals 441, 442 create an at least substantially fluid tight seal between the intensifier piston 440 and the cavity 430*a* and passage 438*c*, respectively. A retaining ring 439 limits movement of the intensifier piston 440 in a direction away from the end cap 417.

The blow-off piston 429 is supported for axial movement on the support shaft 430 and includes an internal recess 429*a*, which together with an external surface of the support shaft 430 defines an interior chamber. Seals 427, 428 create a fluid tight seal between the external surface of the support shaft 430 and the blow-off piston 429. The internal recess 429*a* is sized and shaped such that the internal chamber of the blow-off piston 429 communicates with the cavity 430*a* of the support shaft through the orifice 430*b*, preferably in all axial positions of the blow-off piston 429. Thus, the chamber, defined by the internal recess 429*a*, and the cavity 430*a* cooperate to form an intermediate incompressible fluid chamber 433. Damping fluid within the intermediate chamber 433 is pressurized by a small diameter end of the intensifier piston 440 and applies a force tending to move the blow-off piston 429 against the damp plate 431 to close the passage(s) 431*a*. The force applied by the pressurized fluid within the intermediate chamber 433 to the surfaces of the blow-off piston 429 within the recess closest to the end cap 417 tends to move the blow-off piston 429 toward a position closing the passage(s) 431*a*.

With reference to FIG. 8*a*, the blow-off piston 429 includes a closable fill port 429*b*. The fill port 429*b* permits the fluid chamber 433 to be filled with incompressible damping fluid during assembly of the reservoir assembly 420.

With continued reference to FIG. 8*a*, preferably the reservoir assembly 420 includes an adjustment mechanism that permits adjustment of the pressurization force applied to the fluid within the intermediate chamber 433 by the intensifier piston 440. More preferably, the adjustment mechanism applies a force to the intensifier piston 440 tending to counteract motion of the intensifier piston 440 into the cavity 430*a* of the support shaft 430. In the illustrated arrangement, a compressible gas chamber 445 is defined by the support plate 438. An intermediate section of the intensifier piston 440, between the seals 441, 442, passes through the gas chamber 445. A pressurized gas within the gas chamber 445 acts on the transition surface between the small and large diameter ends of the intensifier piston 440 to apply a force tending to move the intensifier piston 440 out of the cavity 430*a*.

Preferably, a gas pressure level within the gas chamber 445 is adjustable. In the illustrated arrangement, a sleeve 421 surrounds the reservoir housing 416 adjacent the gas chamber 445 and includes an inlet valve 418, which permits gas, such as nitrogen, to be introduced into the gas chamber 445, thereby adjusting a pressure level within the chamber 445. One or more passages 446 may extend through the reservoir housing 416 to permit the gas chamber 445 to communicate with a space between the sleeve 421 and an outer surface of the housing 416.

In addition, preferably, a volume of the gas chamber 409 defined by the floating piston 412 and the reservoir housing 416 is adjustable. In the illustrated arrangement, a sleeve 449 surrounds an end of the reservoir housing 416 adjacent the end cap 419. An inner surface of the sleeve 449 has a larger diameter than an outer surface of the reservoir housing 416 to define a space 449*a* therebetween. An end of the sleeve 449 closest to the end cap 419 is sealed with an external surface of the reservoir housing 416 by a seal 450.

A movable seal 451 contacts an inner surface of the sleeve 449 and an outer surface of the reservoir housing 416 to seal the space 449*a* at an end of the sleeve 449 furthest from the end cap 419. The movable seal 451 is movable relative to the sleeve 449 to vary a volume of the space 449. The position of the movable seal 451 is controlled by a collar 423, which engages the movable seal 451, and a nut 422. The nut 422 is threadably engaged with the housing 416 such that rotation of the nut 422 moves the collar 423 axially relative to the housing 416 to move the movable seal 451 and vary the volume of the space 449*a*. The space 449 communicates with the gas chamber 409 via one or more ports 449*b* extending through the reservoir housing 416. Thus, varying the volume of the space 449 varies the volume of the collective volume of the gas chamber 409 and space 449, thus varying the pressure therewithin.

In operation, as the damping fluid contained within the shock body 406 is displaced by the insertion of the shock shaft 405, damping fluid is conveyed to the reservoir assembly 420 by the attached flexible hose 403. The entering damping fluid passes into the reservoir end cap 417 through the port 417. The damping fluid within the sealed incompressible fluid chamber 433 is pressurized by the intensifier piston 440 that has a seal at both big and small diameters. Due to the differing diameters contained on the outside of the intensifier support shaft 430, damping fluid driven by the intensifier piston 440 is forced into the space 429*a* contained between sealed surfaces of the intensifier support shaft 430 and the blow-off piston 429. The ratio of differing diameters on the intensifier piston 440 as compared to the ratio of differing diameters between the intensifier shaft 430 and blow-off piston 429 create a magnification of force/pressure.

The reservoir assembly 420 is powered by the high-pressure gas charge within the gas chamber 409 that is isolated from the damping fluid by the internal floating piston 412. Given a static condition, the high-pressure gas charge 409, located between the internal floating piston 412 and the reservoir end cap 419, places the same pressure on the damping fluid. As a result of the high pressure gas charge in gas chamber 409, the combined system of components referred to as "the intensifier", preferably including the blow-off piston 429, intensifier piston 440, support shaft 430, compression damp plate 431, and support plate 438 cause the end face of the compression damp plate 431 to seal against the blow-off piston 429. This provides a compression damping function that can be characterized as a "Build pressure and dump" type of action. This can be described as a "knee" or "nose" as one skilled in the art would understand. This can be graphically depicted as shown in FIG. 11. This type of damping function is desirable for certain applications as it provides, for example when utilized in a bicycle shock absorber, an increase in pedaling efficiency, in that each down stroke of the pedals does not result in as much compression movement of the suspension as would normally occur with a prior art suspension assembly.

In order to provide further external adjustability of the reservoir assembly 420, a separate chamber 445 that contains a compressible gas is provided, as described above. The pressure/volume of compressible gas contained within this region acts upon the area on the intensifier piston 440 between the two sealing means 440 and 442. As a result of the differing diameters that exist between the sealing means, a variable pressure/volume is present. This variable pressure/volume permits the adjustment of contained compressible gas to counteract the pressure/force that is applied to the end face of the intensifier piston 440 that is on the damping fluid side of the system, next to the internal floating piston 412. With this in mind, the sealing force on the blow-off piston 429 can be reduced along with the resultant blow-off force. Although this feature is not required, it is illustrated and it is also included in the preferred embodiment of the present invention as shown in FIGS. 5-10. If this adjustable damping feature is not included, a somewhat simplified and less costly preferred embodiment is possible.

Further advantages of the illustrated embodiment include a compression damping force influenced by the position of the shock shaft 405 insertion into the main shock body 406 and how this relates to the pressure increase in the high pressure gas charge 409. The pressure increase in this region will impart the same amount of pressure increase to the "incompressible" damping fluid present on the other side of the internal floating piston 412. This same pressure/force is imparted on the largest end face of the intensifier piston 440, that in turn increases the sealing force on the blow-off piston 429 the deeper the shock shaft 405 is inserted into the main shock body 406. This will provide an increase in sealing force; hence more compression damping. This is highly advantageous to provide position-sensitive compression damping forces. With this arrangement, tune-ability of the compression system is obtained with position sensitive traits that would not otherwise be available in a conventional DeCarbon-type shock absorber. In addition, the preferred embodiment has a wide range of tune ability, not found in other shock systems.

Figure 9:
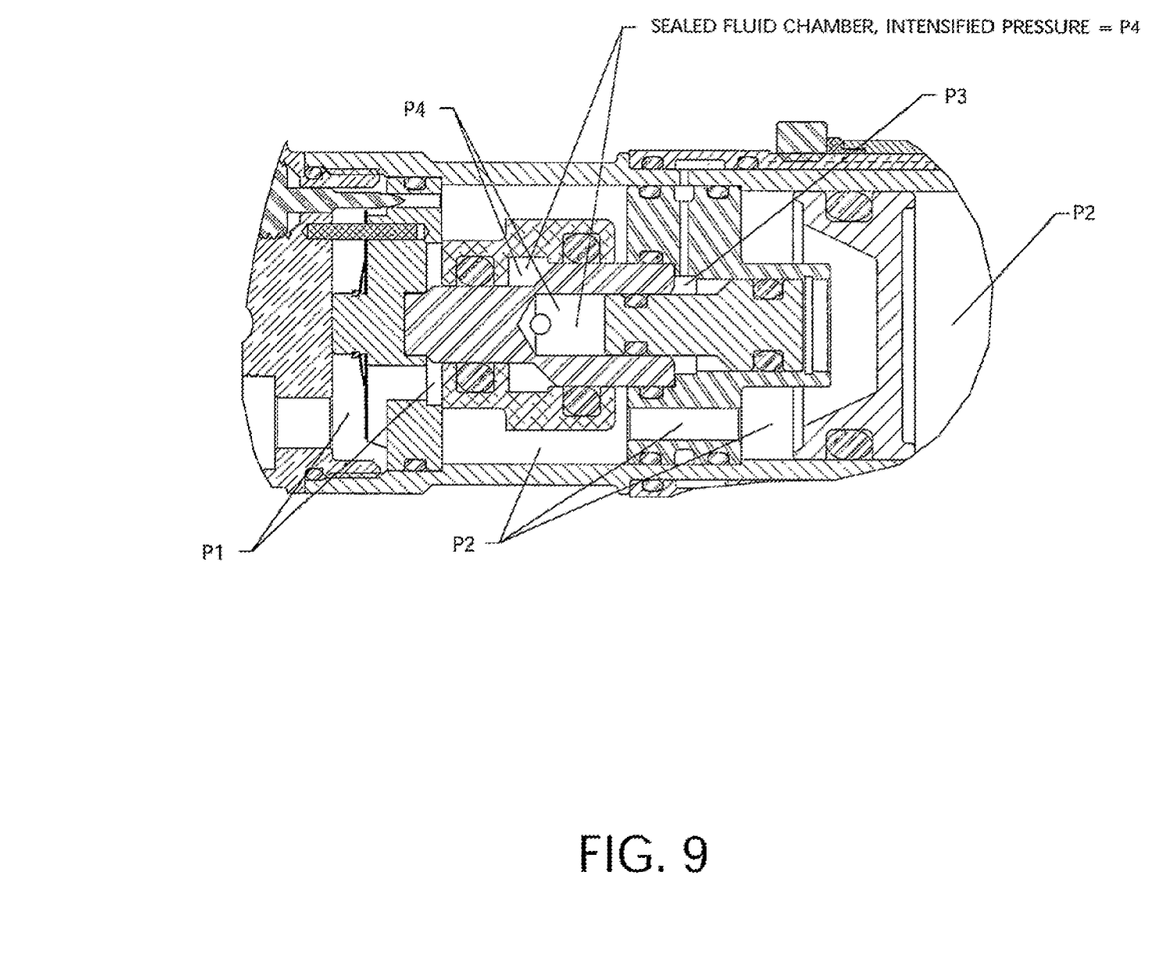
FIG. 9 is an enlarged view of the intensifier assembly of FIG. 8b, including designations of the four different internal pressures operative in the reservoir.
Figure 10:
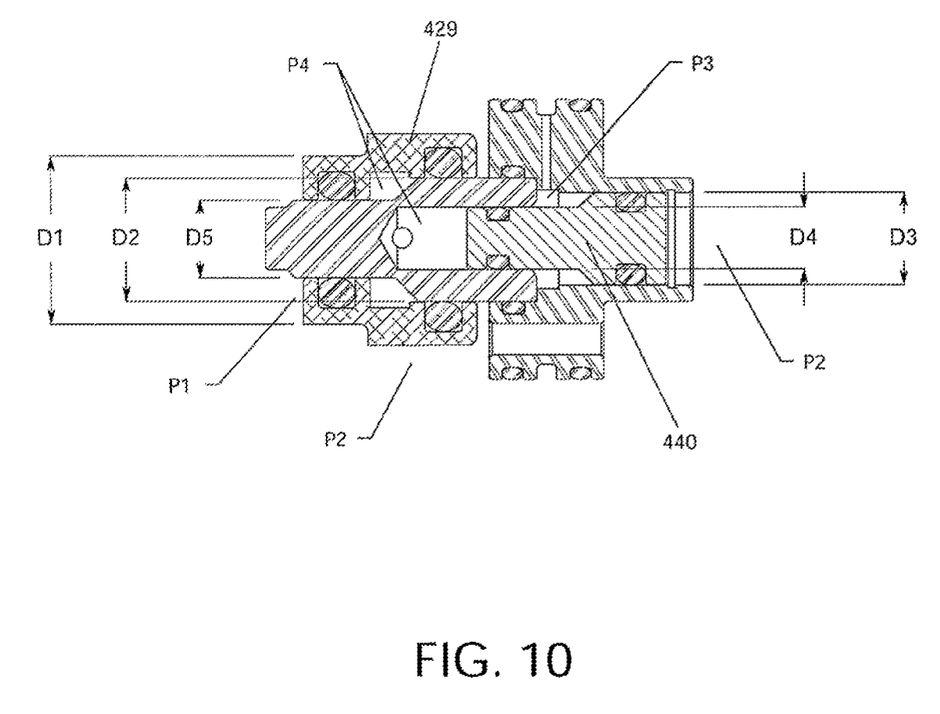
FIG. 10 is an enlarged view of elements comprising the intensifier assembly of FIG. 9, including designation of the component diameters pertinent to free-body analysis of the operative forces on the intensifier piston and the blow-off piston.

The following example mathematically demonstrates the function and relation of the preferred control system. With reference to FIG. 9, showing pressures, and FIG. 10 showing pertinent feature diameters, a free-body analysis of the blow-off piston 429 gives:

Referring to the feature diameters per FIG. 10, it is convenient to define the relevant areas of the blow-off piston 429 and the intensifier piston 440 acted upon by the various internal pressures as follows:

$A1=[\pi/4]*[D1^2-D5^2]$ {ref: 429—acted upon by $P1$; to the RIGHT}

$A2=[\pi/4]*[D1^2-D2^2]$ {ref: 429—acted upon by $P2$; to the LEFT}

$A3=[\pi/4]*[D3^2]$ {ref: 440—acted upon by $P2$; to the LEFT}

$A4=[\pi/4]*[D4^2]$ {ref: 440—acted upon by $P4$; to the RIGHT}

$A5=[\pi/4]*[D2^2-D5^2]$ {ref: 429—acted upon by $P4$; to the LEFT}

$A6=[\pi/4]*[D3^2-D4^2]$ {ref: 440—acted upon by $P3$; to the RIGHT}

Still referring to FIGS. 9 and 10, the forces acting on blow-off piston 429 are:

Forces to the RIGHT=$[P1]*[A1]$

Forces to the LEFT=$[P2]*[A2]+[P4]*[A5]$

Based on free-body analysis, when blow-off piston 429 opens (moves to the right), these forces are equal, and the following relationship holds:

$[P1]*[A1]=[P2]*[A2]+[P4]*[A5]$

Re-arranging gives the following expression for pressure P1 as a function of feature areas (diameters), reservoir pressure P2, and intensifier pressure P4:

$$P1=[P2]*[A2/A1]+[P4]*[A5/A1] \quad \{Equation \#1\}$$

Next, the forces acting on intensifier piston 440 are:

Forces to the RIGHT=$[P4]*[A4]+[P3]*[A6]$

Forces to the LEFT=$[P2]*[A3]$

For equilibrium conditions (i.e., under normal operation conditions where the intensifier piston 440 is freely-floating, neither topped-out nor bottomed-out in its travel), these forces are equal:

$[P4]*[A4]+[P3]*[A6]=[P2]*[A3]$

Re-arranging gives:

$$P4=[P2]*[A3/A4]-[P3]*[A6/A4] \quad \{Equation \#2\}$$

By substituting the right side of Equation #2 for P4 in Equation #1 above, an expression for pressure P1 is determined as a function of specific feature areas (diameters), the pre-set reservoir pressure P2, and the adjustable pressure P3:

$$P1=[P2]*[A2/A1]+\{[P2]*[A3/A4]-[P3]*[A6/A4]\}*[A5/A1] \quad \{Equation \#3\}$$

The compression damping force thus produced by the pressure-sensitive reservoir assembly 420 of the present invention is equal to the above value of P1 minus reservoir pressure P2, times the cross-sectional area of the shock absorber shaft 405. (Note that reservoir pressure P2 acting on the area of the shock absorber shaft is subtracted here; it creates a "nose force" tending to extend the shock absorber at all times, but, as is known in the art, this is considered a static force, not a damping force.) Of course, as contemplated by the present invention, there will generally be additional compression damping forces produced by fluid flow restrictions at the main shock absorber damping piston 410.

Following is a numeric example:

P2=100 psi
P3=0 psi
DI=0.625"
D2=0.400"
D3=0.375"
D4=0.250"
D5=0.312"

Substituting these values into the above equations for areas gives:

A1=0.230 in$^2$
A2=0.181 in$^2$
A3=0.110 in$^2$
A4=0.049 in$^2$
A5=0.049 in$^2$
A6=0.061 in$^2$

Inserting these values, as well as P2=100 psi and P3=0 psi into Equation #3 above gives:

P1=127 psi

As is apparent, if P3 is changed, the result of the equilibrium equation will be different. This demonstrates to the ability to tune the pressure blow-off threshold by changing the volume of the gas chamber 409, which changes the pressure therein.

Further advantages of the illustrated embodiment are provided by the alternate path for damping fluid provided by the compression by-pass bleed circuit 415*a*. When the compression by-pass bleed circuit 415*a* is in the fully "in" or full clock-wise position, no alternate path for damping fluid exists and all damping fluid being displaced from the main shock body 406 must move through the passage 431*a* found in the compression damp plate 431 by moving the blow-off piston 429. As the compression bypass bleed screw 415 is turned in a counter-clockwise direction, it presents an alternative path for the damping fluid to pass to the opposite side of the compression damp plate 431. The function of this "alternative path" is such that it decreases the low shaft velocity compression damping that is created by the reservoir assembly 420. As a further consequence of the size/diameter of the "alternative path," the overall decrease in compression damping is such that the "alternative path" can't pass the entire volume of damping fluid that is flowing to the compression damp plate 431. If this adjustable damping feature is not included, a somewhat simplified and less costly preferred embodiment is possible.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combinations or subcombinations of the specific features and aspects of the embodiments may be made and still fall within the scope of the invention. Accordingly, it should be understood that various features and aspects of the disclosed embodiments can be combine with or substituted for one another in order to form varying modes of the disclosed invention. Thus, it is intended that the scope of the present invention herein disclosed should not be limited by the particular disclosed embodiments described above.

What is claimed is:

1. A pressure-sensitive damper, comprising:
 a first cylinder at least partially defining a first fluid chamber containing a damping fluid;
 a damping piston for reciprocal motion within the first cylinder;
 a piston rod having a first end connected to the damping piston, and a second end extending through an end of the first cylinder;
 a second cylinder at least partially defining a second fluid chamber in fluid communication with the first cylinder;
 a compression damping plate fixed in the second cylinder;
 at least one passage in the compression damping plate through which the damping fluid, displaced by the piston rod, flows in a first direction from the first fluid chamber to the second fluid chamber;
 a first pressure source in communication with the second fluid chamber;
 a valve for generating a resistance force to the fluid flow, wherein the resistance force varies according to an amount of force communicated to the valve by the first pressure source, the valve comprising:
  a blow-off piston having a first position in engagement with the at least one passage and a second position removed from the at least one passage and,
 an intensifier piston;
 wherein the first pressure source acts on a first end of the intensifier piston and generates an intensified pressure at a second end of the intensifier piston, wherein the intensified pressure is communicated to the blow-off piston to create a force urging the blow-off piston toward the first position and;
 a bypass circuit adapted to permit a flow of the damping fluid in the first direction through the compression damping plate without passing through the at least one passage.

2. A pressure-sensitive damper, comprising:
 a first cylinder at least partially defining a first fluid chamber containing a damping fluid;
 a damping piston for reciprocal motion within the first cylinder;
 a piston rod having a first end connected to the damping piston, and a second end extending through an end of the first cylinder;
 a second cylinder at least partially defining a second fluid chamber in fluid communication with the first cylinder;
 a compression damping plate fixed in the second cylinder;
 at least one passage in the compression damping plate through which the damping fluid, displaced by the piston rod, flows in a first direction from the first fluid chamber to the second fluid chamber;
 a first pressure source in communication with the second fluid chamber;
 a valve for generating a resistance force to the fluid flow, wherein the resistance force varies according to an amount of force communicated to the valve by the first pressure source, the valve comprising:
  a blow-off piston having a first position in engagement with the at least one passage and a second position removed from the at least one passage and,
 an intensifier piston;
 wherein the first pressure source acts on a first end of the intensifier piston and generates an intensified pressure at a second end of the intensifier piston, wherein the intensified pressure is communicated to the blow-off piston to create a force urging the blow-off piston toward the first position; and an externally-adjustable bypass circuit adapted to permit a flow of the damping fluid in the first direction through the compression damping plate without passing through the at least one passage.

3. The damper of claim 1, further comprising a second pressure source acting on the intensifier piston, the second pressure source adapted to generate a force tending to counteract the amount of force communicated to the valve by the first pressure source.

4. The damper of claim 3, wherein a pressure level of the second pressure source is adjustable.

5. The damper of claim 1, wherein a pressure level of the first pressure source is adjustable.

6. The damper of claim 1, wherein the first pressure source comprises a pressurized, compressible chamber containing compressible fluid.

7. The damper of claim 6, wherein the first pressure source additionally comprises an annular chamber with externally-adjustable volume.

8. The damper of claim 1, wherein the blow-off piston moves in an axial direction between the first position and the second position.

9. A pressure-sensitive damper, comprising:
a first cylinder at least partially defining a first fluid chamber containing a damping fluid;
a damping piston for reciprocal motion within the first cylinder;
a piston rod having a first end connected to the damping piston, and a second end extending through an end of the first cylinder;
a second cylinder at least partially defining a second fluid chamber in fluid communication with the first cylinder;
a compression damping plate fixed in the second cylinder;
at least one passage in the compression damping plate through which the damping fluid, displaced by the piston rod, flows in a first direction from the first fluid chamber to the second fluid chamber;
a first pressure source in communication with the second fluid chamber;
a valve for generating a resistance force to the fluid flow, wherein the resistance force varies according to an amount of force communicated to the valve by the first pressure source, the valve comprising:
a blow-off piston having a first position in engagement with the at least one passage and a second position removed from the at least one passage and,
an intensifier piston;
wherein the first pressure source acts on a first end of the intensifier piston and generates an intensified pressure at a second end of the intensifier piston, wherein the intensified pressure is communicated to the blow-off piston to create a force urging the blow-off piston toward the first position and further comprising a shaft extending from the compression damping plate, wherein the intensifier piston is at least partially disposed in the shaft and moves relative to the shaft;
wherein the blow-off piston moves in an axial direction between the first position and the second position and the blow-off piston and the intensifier piston move in the same direction.

10. The damper of claim 9, wherein the blow-off piston comprises an annular piston disposed around the shaft.

11. A pressure-sensitive damper, comprising:
a first cylinder at least partially defining a first fluid chamber containing a damping fluid;
a damping piston for reciprocal motion within the first cylinder;
a piston rod having a first end connected to the damping piston, and a second end extending through an end of the first cylinder;
a second cylinder at least partially defining a second fluid chamber in fluid communication with the first cylinder;
a compression damping plate fixed in the second cylinder;
at least one passage in the compression damping plate through which the damping fluid, displaced by the piston rod, flows in a first direction from the first fluid chamber to the second fluid chamber;
a first pressure source in communication with the second fluid chamber;
a valve for generating a resistance force to the fluid flow, wherein the resistance force varies according to an amount of force communicated to the valve by the first pressure source, the valve comprising:
a blow-off piston having a first position in engagement with the at least one passage and a second position removed from the at least one passage and,
an intensifier piston;
wherein the first pressure source acts on a first end of the intensifier piston and generates an intensified pressure at a second end of the intensifier piston, wherein the intensified pressure is communicated to the blow-off piston to create a force urging the blow-off piston toward the first position and;
a second passage in the compression damping plate adapted to allow fluid flow from the second fluid chamber to the first fluid chamber.

12. The damper of claim 11, further comprising a one-way valve that permits fluid flow in a second direction through the second passage, but not in the first direction.

13. The damper of claim 2, further comprising a second pressure source acting on the intensifier piston, the second pressure source adapted to generate a force tending to counteract the amount of force communicated to the valve by the first pressure source.

14. The damper of claim 13, wherein a pressure level of the second pressure source is adjustable.

15. The damper of claim 2, wherein a pressure level of the first pressure source is adjustable.

16. The damper of claim 2, wherein the first pressure source comprises a pressurized, compressible chamber containing compressible fluid.

17. The damper of claim 16, wherein the first pressure source additionally comprises an annular chamber with externally-adjustable volume.

18. The damper of claim 2, wherein the blow-off piston moves in an axial direction between the first position and the second position.

19. The damper of claim 18, wherein the blow-off piston and the intensifier piston move in the same direction.

20. The damper of claim 19, further comprising a third fluid chamber formed between the blow-off piston and the intensifier piston.

21. The damper of claim 20, wherein a diameter of the second end of the intensifier piston is smaller than an outer diameter of the blow-off piston.

* * * * *